United States Patent

Brown et al.

[11] Patent Number: 6,044,806
[45] Date of Patent: Apr. 4, 2000

[54] METHOD AND APPARATUS FOR DETECTING GASEOUS FUEL LEAKAGE THROUGH A GASEOUS FUEL ADMISSION VALVE WITHIN AN ENGINE

[75] Inventors: Scott C. Brown, Peoria, Ill.; Martin L. Willi, Lafayette, Ind.

[73] Assignee: Caterpillar Inc., Peoria, Ill.

[21] Appl. No.: 08/994,693

[22] Filed: Dec. 19, 1997

[51] Int. Cl.[7] ..................................... F02B 1/10
[52] U.S. Cl. ............... 123/27 GE; 123/352; 123/359; 123/529; 73/660
[58] Field of Search .................. 123/359, 352, 123/27 GE, 525, 526, 527, 529, 435; 73/660

[56] References Cited

U.S. PATENT DOCUMENTS

| | | | |
|---|---|---|---|
| 3,573,474 | 4/1971 | Grossoehme | 123/352 |
| 4,469,065 | 9/1984 | Hasegawa et al. | 123/359 |
| 4,597,364 | 7/1986 | Young . | |
| 4,903,670 | 2/1990 | Bauder | 123/359 |
| 4,955,326 | 9/1990 | Helmich . | |
| 4,980,844 | 12/1990 | Demjanenko et al. | 73/660 |
| 5,014,543 | 5/1991 | Franklin et al. | 73/40.5 R |
| 5,136,986 | 8/1992 | Jensen . | |
| 5,150,685 | 9/1992 | Porter et al. . | |
| 5,188,077 | 2/1993 | Bauder | 123/359 |
| 5,224,457 | 7/1993 | Arsenault et al. | 123/27 GE |
| 5,398,724 | 3/1995 | Vars et al. . | |
| 5,408,957 | 4/1995 | Crowley | 123/27 GE |
| 5,497,653 | 3/1996 | Snow | 73/40.5 R |
| 5,526,786 | 6/1996 | Beck et al. . | |
| 5,575,267 | 11/1996 | Matsumoto et al. | 123/698 |
| 5,610,339 | 3/1997 | Haseley et al. | 73/660 |
| 5,611,316 | 3/1997 | Oshima et al. | 123/529 |
| 5,635,646 | 6/1997 | Eriksson | 73/660 |
| 5,803,057 | 9/1998 | Van De Brink | 123/527 |

FOREIGN PATENT DOCUMENTS

| | | | |
|---|---|---|---|
| 0 108 582 | 5/1984 | European Pat. Off. | F02B 7/06 |
| 0 785 349 | 7/1997 | European Pat. Off. | F02D 41/22 |
| 2935-913 | 3/1981 | Germany | 123/529 |

Primary Examiner—Henry C. Yuen
Assistant Examiner—Jason Benton
Attorney, Agent, or Firm—Haverstock, Garrett & Roberts

[57] ABSTRACT

A method of detecting leakage through a gaseous fuel admission valve of a dual fuel engine including at least one such gaseous fuel admission valve and a gaseous fuel shut off valve includes determining a liquid fuel rate when the engine is operating in a liquid fuel mode and the gaseous fuel shut off valve is closed. The gaseous fuel shut off valve is thereafter opened while the engine is operating in the liquid fuel mode. A liquid fuel rate is determined after the gaseous fuel shut off valve is opened and the liquid fuel rate determined before opening of the gaseous fuel shut off valve is compared with the liquid fuel rate determined after opening of the gaseous fuel shut off valve. A detonation level within the engine cylinder may also be checked to determine if such detonation level exceeds a predetermined level indicative of gaseous fuel leakage. The detonation level check may also be utilized in a spark-ignited engine.

15 Claims, 4 Drawing Sheets

Fig_1_

METHOD AND APPARATUS FOR DETECTING GASEOUS FUEL LEAKAGE THROUGH A GASEOUS FUEL ADMISSION VALVE WITHIN AN ENGINE

TECHNICAL FIELD

This invention relates generally to gaseous fuel admission valves, and more particularly, to a method and apparatus for detecting leakage of gaseous fuel through one or more gaseous fuel admission valves of an engine.

BACKGROUND ART

A dual fuel engine can typically operate in two modes. In a strictly liquid fuel mode a liquid fuel, such as diesel fuel, is injected directly into an engine cylinder or a precombustion chamber as the sole source of energy during combustion. In a dual fuel mode a gaseous fuel, such as natural gas, is mixed with air in an intake port of a cylinder and a small amount of diesel fuel is injected into the cylinder or the precombustion chamber in order to ignite the mixture of air and gaseous fuel. In such dual fuel engines, one or more of such gaseous fuel admission valves are positioned between a source of gaseous fuel and an air intake of the engine. When a gaseous fuel admission valve is opened the gaseous fuel passes into the air intake for mixing with the air. Such gaseous fuel admission valves may also be utilized in spark-ignited engines.

A solenoid actuated gaseous fuel admission valve such as that described in U.S. Pat. No. 5,398,724 can be used to deliver the gaseous fuel in such engines. The nature of solenoid actuated gaseous fuel admission valves is such that a current delivered to a solenoid coil thereof actuates the valve. However, problems can arise with such gaseous fuel admission valves, including that it is sometimes possible for such valves to become stuck. For example, typically a solenoid operated valve includes a movable plate and a stationary plate or seat. If even small particulates get trapped between the movable plate and the stationary plate, the two may be positioned far enough apart to allow flow, particularly where the valve is positioned to control the flow of a gaseous fluid. It is desirable in dual fuel engines to be able to determine if a gaseous fuel admission valve is stuck open, or if some other condition is causing gaseous fuel leakage through the valve.

Accordingly, the present invention is directed to overcoming one or more of the problems as set forth above.

DISCLOSURE OF THE INVENTION

In one aspect of the present invention a method of detecting leakage through a gaseous fuel admission valve of a dual fuel engine including at least one such gaseous fuel admission valve and a gaseous fuel shut off valve is provided. The method includes determining a liquid fuel rate when the engine is operating in a liquid fuel mode and the gaseous fuel shut off valve is closed. The gaseous fuel shut off valve is thereafter opened while the engine is operating in the liquid fuel mode. A liquid fuel rate is determined after the gaseous fuel shut off valve is opened and the liquid fuel rate determined before opening of the gaseous fuel shut off valve is compared with the liquid fuel rate determined after opening of the gaseous fuel shut off valve.

In another aspect of the present invention, a method of detecting leakage through a gaseous fuel admission valve of an engine is provided. The method includes sensing a detonation level associated with at least one cylinder of the engine while the engine is operating. The sensed detonation level is compared with a predetermined detonation level indicative of gaseous fuel leakage.

The two aforementioned methods can be utilized separately, or in conjunction with one another in a dual fuel engine. Further, a gaseous fuel leakage detection system can be incorporated into an engine for operation in accordance with the inventive method or methods.

BEST MODE FOR CARRYING OUT THE INVENTION

Figure 1:
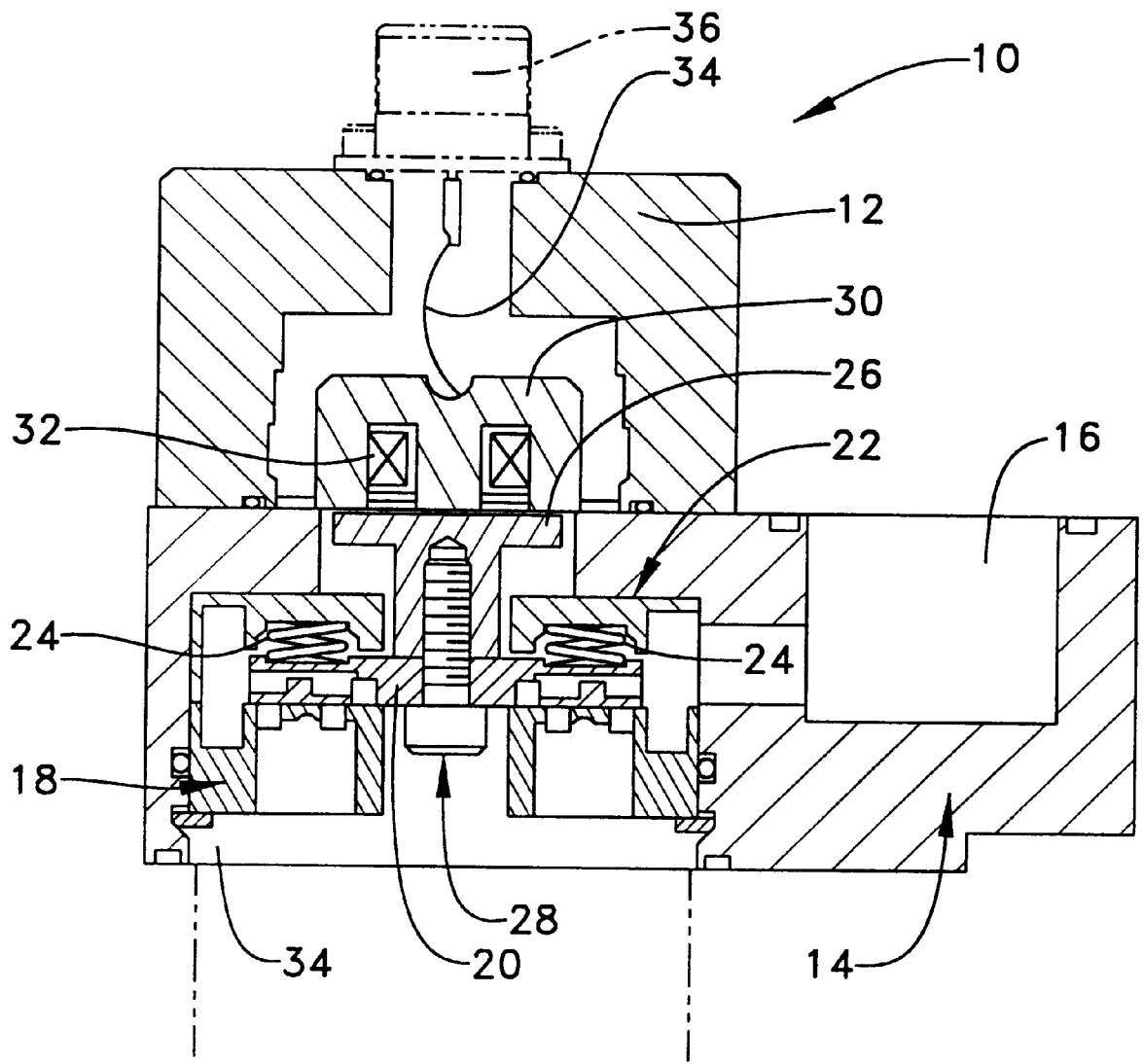
FIG. 1 shows a cross-sectional view of a normally-closed solenoid actuated valve assembly.

Referring to the drawings, numeral 10 in FIG. 1 is a solenoid actuated gaseous fuel admission valve as shown and described in U.S. Pat. No. 5,398,724. Valve 10 includes a E-core housing 12 and a valve assembly housing 14 including a gaseous fuel inlet port 16. The valve assembly includes a stationary plate or disk 18, a movable plate or disk 20, a spring seat structure 22, springs 24, a low mass armature 26, and a screw 28 securing the movable disk 20 to the low mass armature 26. Positioned within E-core housing 12 is an E-core 30 including a solenoid coil 32 wound thereon, the solenoid coil 32 being connected via wires 34 to an electrical connector 36 which may be mounted on the E-core housing 12.

Valve 10 is a normally-closed valve in which springs 24 hold a lower surface of movable disk 20 against an upper surface of stationary disk 18, the two surfaces being configured to provide a sealed relationship. A top surface of movable disk 20 is spaced from the spring seat structure to allow upward movement of the movable disk 20. Similarly, an upper surface of low mass armature 26 is spaced from the bottom of E-core 30 to allow upward movement of the low mass armature 26. When an actuating current is delivered to coil 32 the low mass armature 26 is pulled upward toward the E-core 30 and, being attached thereto, movable disk 20 is similarly pulled upward. When pulled upward, the bottom surface of movable disk 20 moves out of its sealed relationship with respect to the top surface of stationary disk 18, allowing gaseous fuel to flow from inlet port 16, through openings in the stationary disk 18, and out a gaseous fuel outlet 34.

Figure 2:
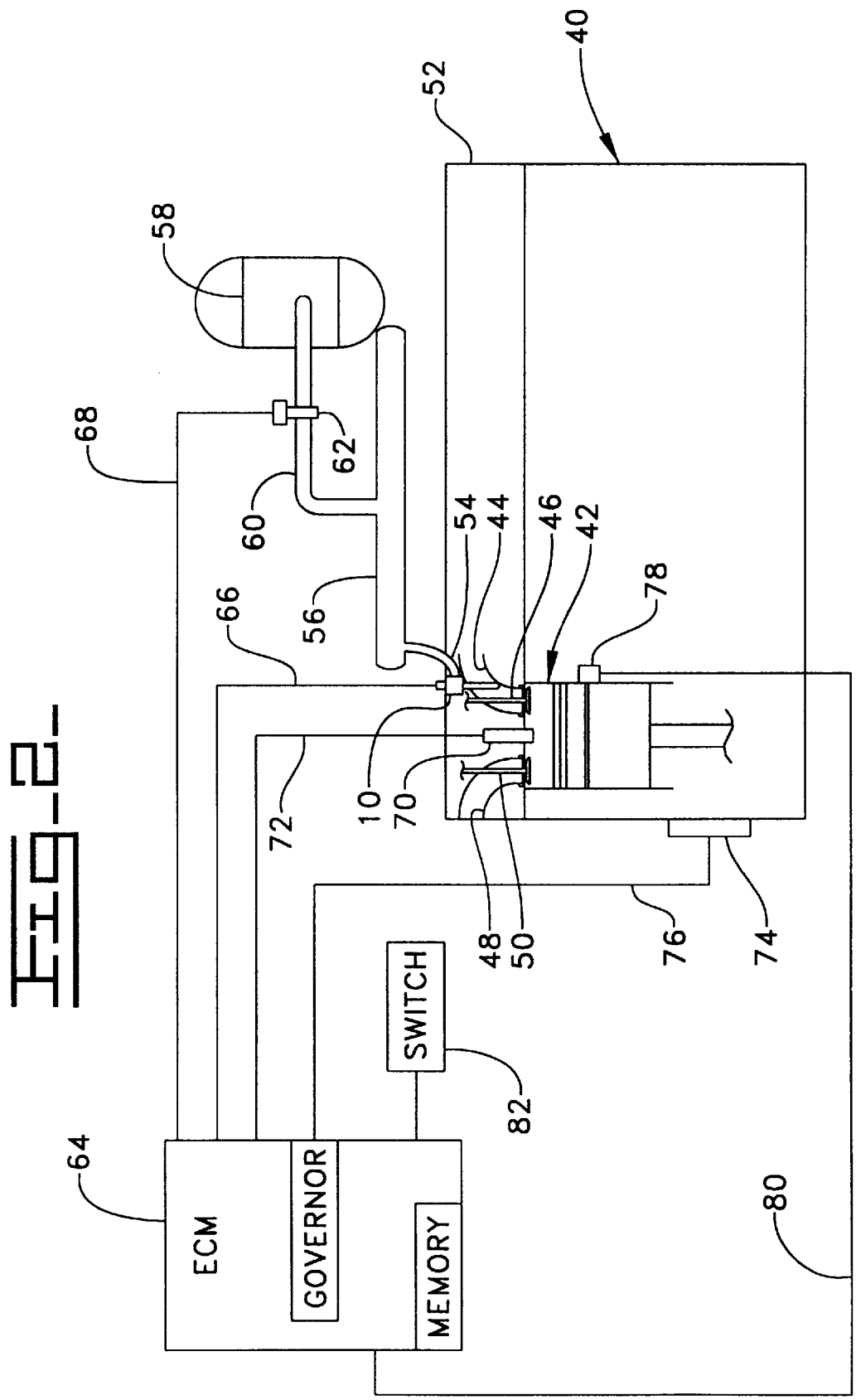
FIG. 2 shows an illustration of an engine including a fuel leakage detection system.

A dual fuel engine 40 is depicted in FIG. 2, showing only one cylinder 42 for purposes of clarity. However, it is recognized that the number of cylinders included in such an engine could vary. Similarly, it is recognized that engine 40 could be an in-line engine, v-type engine or rotary engine. An intake port 44 to cylinder 42 includes an intake valve 46, intake port 44 commonly being connected to an air intake manifold (not shown). An exhaust port 48 from cylinder 42 includes an exhaust valve 50. A gaseous fuel admission valve 10 is positioned within engine head 52 and is connected via fuel inlet port 54 to a gaseous fuel inlet manifold 56 which in turn is connected to a source of gaseous fuel 58 via fuel path 60. A gaseous fuel shut off valve 62 is positioned between the source of gaseous fuel 58 and the gaseous fuel manifold 56. Shut off valve 62 may be a normally-closed solenoid-type valve commonly known in the art. Although not shown, such a gaseous fuel system might typically include a balance regulator positioned between the source of gaseous fuel and the gaseous fuel manifold. A nozzle portion of the gaseous fuel admission valve 10 is positioned within intake port 44 of cylinder 42 to enable mixing of gaseous fuel with intake air. An electronic control module (ECM) 64 is connected to valve 10 for control thereof via conductive path 66. It is known in the art to incorporate within such an ECM driver circuitry for delivering current signals to valve 10, as well as processing means such as a microcontroller or microprocessor. However, it is recognized that such driver circuitry could be formed separate from, but connected to, the ECM 64. ECM 64 is also connected to gaseous fuel shut off valve 62 via conductive path 68 for control thereof.

A fuel injector 70, commonly referred to as an electronic unit injector, is positioned within engine head 52 and connected to ECM 64 via conductive path 72. Fuel injector 70 is connected to a source of liquid fuel such as diesel fuel (not shown) to enable injection of such fuel into the cylinder 42. Incorporated within ECM 64 is driver circuitry for delivering current signals to the injector. An engine speed sensor 74 is connected to the camshaft of engine 40 and is also connected to ECM 64 via conductive path 76 for delivering engine speed indicative signals thereto.

A detonation sensor 78 is positioned on engine block 40 for monitoring detonation within cylinder 42 and delivering detonation level indicative signals to ECM 64 via conductive path 80. Detonation sensor 78 could, for example, be an accelerometer or other noise/vibration detection device, the use of which is known in the art. Because many vibrations are produced by an engine, and the frequency of cylinder detonation vibrations is typically a function of the engine bore size, ECM 64 might typically include bandpass filter circuitry, as is known in the art, to filter out noise from the detonation sensor signals.

As noted above, dual fuel engine 40 can operate in a liquid fuel mode in which diesel fuel only is delivered to the engine cylinders by the fuel injectors 70. Engine 40 can also operate in a dual fuel mode in which gaseous fuel, such as natural gas, is delivered by gaseous fuel admission valves 10, and in which a small amount of diesel fuel is also delivered to the cylinders. Typically control of the mode of engine operation may be via operator input to ECM 64 such as from a mode selection switch 82, as well as from other engine operating parameters sensed by ECM 64 such as engine speed and engine load.

When the engine operates in the liquid fuel mode gaseous fuel shut off valve 62 will preferably be closed. The shut off valve 62 is of course opened during a dual fuel mode of engine operation. During the liquid fuel mode of operation it is typical to maintain a constant engine speed utilizing a governor incorporated within ECM 64 as is known in the art. For example, the governor could be a Proportional Integral Derivative (PID) controller. In general, the governor monitors speed signals from engine speed sensor 74 and outputs a fuel rate indicator which is utilized by the ECM 64 to affect delivery of an appropriate current signal to fuel injector 70. If the engine speed falls below the desired constant speed the governor will output a fuel rate indicator which calls for more fuel to be injected. Similarly, if the engine speed increases above the desired constant engine speed the governor outputs a fuel rate indicator which calls for less fuel to be injected. Under a constant load, the fuel rate indicator from the governor should ordinarily remain about constant in order to maintain the desired constant engine speed.

Figure 3:
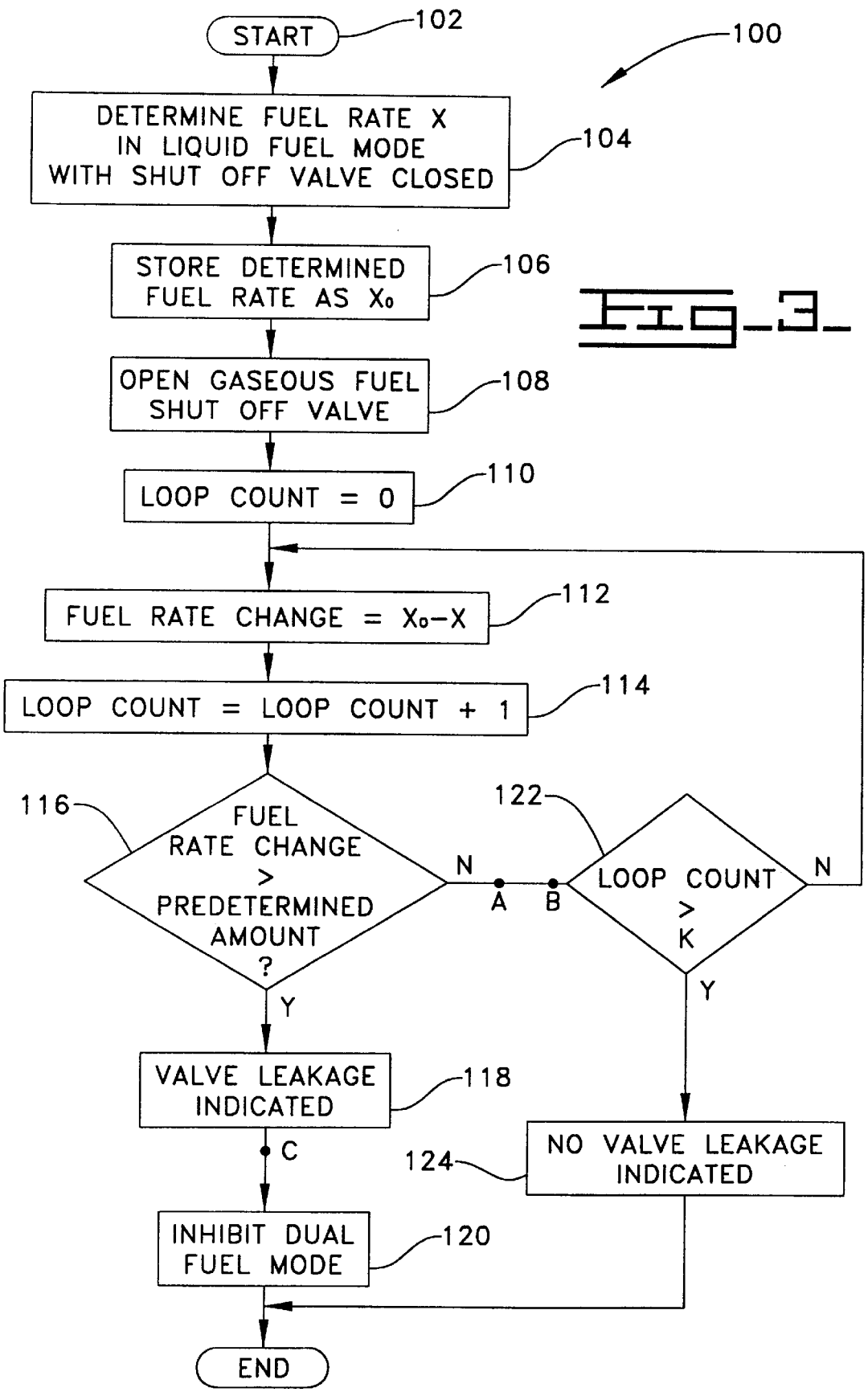
FIG. 3 shows a flowchart of steps in accordance with one embodiment of the present invention.

Operating steps in accordance with one aspect of the present invention are illustrated in flowchart 100 of FIG. 3. Such steps can be incorporated into the programming of the processing means of ECM 64 by techniques well known to those of ordinary skill in the art. The steps of flowchart 100 might be initiated while the engine is operating in a liquid fuel mode after the operator provides an input via mode switch 82 indicating the desire to change to a dual fuel mode of engine operation. Alternatively, if during a dual fuel mode of operation it is desired to check whether there is leakage through one of the gaseous fuel valves, engine operation could be changed to the liquid fuel mode for such purpose. Regardless of how the check is set in motion, the steps begin as indicated at start 102 and the fuel rate X, being the governor output in this case, is determined with the shut off valve closed at step 104. The fuel rate is stored at step 106 as variable $X_0$ in memory associated with the ECM 64. The gaseous fuel shut off valve 62 is then opened as indicated by step 108 and the variable loopcount is set to zero at step 110. The ECM 64 monitors the governor output to determine the fuel rate change $(X_0-X)$ at step 112 and the loopcount variable is incremented by one at step 114. The fuel rate change $(X_0-X)$ is compared to a predetermined amount at step 116 to determine if the fuel rate change $(X_0-X)$ is greater than the predetermined amount. If the fuel rate change $(X_0-X)$ is greater than the predetermined amount, then a determination is made that there is leakage associated with at least one gaseous fuel admission valve as indicated at step 118 and the dual fuel mode of operation may be inhibited as indicated at step 120.

The aforementioned check is effective because the governor attempts to maintain the engine speed at a desired constant level. In the liquid fuel mode, at a constant engine load the engine speed is maintained constant be maintaining a constant fuel delivery rate to the engine. Accordingly, a decrease in the fuel rate indicator X output by the governor after the gaseous fuel shut off valve is opened at step 108 would be the result of the engine speed increasing and, at a constant load, the cause of such an engine speed increase would be the delivery of more fuel to the engine. Such delivery of more fuel to the engine would result from the opening of the gaseous fuel shut off valve where at least one of the gaseous fuel admission valves is leaking. In this regard, due to slight variations in the engine speed and accordingly the fuel delivery rate X that are generally present, it is desirable to compare the fuel rate change $(X_0-X)$ with a predetermined amount. That is, the fuel rate change $(X_0-X)$ should preferably be greater than at least such predetermined amount before a determination is made that there is leakage of a gaseous fuel admission valve. The appropriate predetermined amount will vary with the particular engine and can be determined by appropriate engine testing. Such predetermined amount should preferably be greater than any amount of fuel rate change that might occur during normal engine operation in the liquid fuel mode at a substantially constant engine load.

Referring again to FIG. 3, if the fuel rate change $(X_0-X)$ is not greater than the predetermined amount then a determination is made as to whether the variable loopcount is greater than a predetermined count (K) at step 122. If not, steps 112, 114 and 116 are repeated in order to again check the fuel rate change $(X_0-X)$. It is preferred that such steps be repeated at least a predetermined number of times in order to give the governor time to reflect any leakage that might be occurring. This same repetition of steps 112 and 116 could be achieved by repeating the loop for a predetermined period of time. If the fuel rate change $(X_0-X)$ does not go above the predetermined amount within such time period or within such number (K) of loop repetitions, then no gaseous fuel admission valve leakage is indicated as shown at step 124.

Figure 4:
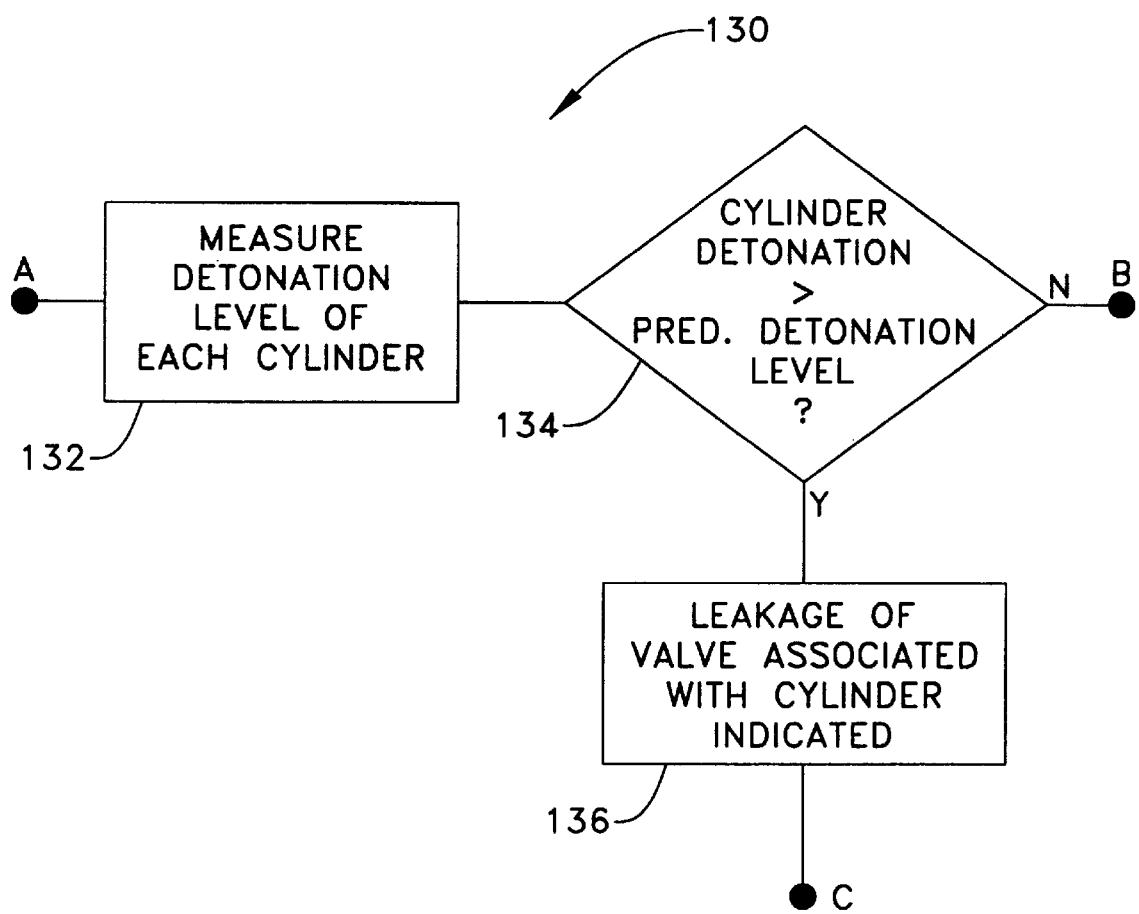
FIG. 4 shows a flowchart of steps in accordance with another embodiment of the present invention.

An alternative gaseous fuel admission valve leakage check is illustrated in flowchart 130 of FIG. 4. After the gaseous fuel shut off valve is opened during the liquid fuel mode of operation, the detonation level of each cylinder is measured as indicated at step 132. Such detonation level measurement will be based upon one or more signals from detonation sensor 78. At step 134 the detonation level of each cylinder is then compared with a predetermined detonation level to determine if the cylinder detonation level is greater than the predetermined level. If the detonation level of a given cylinder is greater than the predetermined detonation level then leakage of the gaseous fuel admission valve associated with that particular cylinder is indicated at step 136. If such a determination is made, operation of the engine in the dual fuel mode could be inhibited. The predetermined detonation level can be a level which is determined based upon engine testing. It is also recognized that the predetermined detonation level could be a function of the average detonation level prior to opening of the gaseous fuel shut off valve, the premise being that a significant detonation level increase after the gaseous fuel shut off valve is opened is probably the result of leakage through the gaseous fuel admission valve.

The steps of flowchart 130 can be used distinct from the steps of flowchart 100 to check for gaseous fuel leakage in either a dual fuel engine or a spark-ignited engine. In a spark-ignited engine injector 70 would be replaced with a spark plug. The two techniques could also be incorporated together within a dual fuel engine. In this regard points A, B, and C within flow charts 100 and 130 represent the points where it is considered steps 132, 134, and 136 could be incorporated into flow chart 100.

INDUSTRIAL APPLICABILITY

As described herein the gaseous fuel admission valve leakage detection system and method enable any such leakage to be detected before a transition of engine operation to the dual fuel mode is made. In many cases if one or more gaseous fuel admission valves has an associated leakage it will be undesirable to operate the engine in the dual fuel mode and such dual fuel mode of operation can be inhibited by ECM 64. Further, a flag could be set or a problem indicator signal could be generated to alert an operator to the potential problem. In a spark-ignited engine where leakage is detected using the detonation level check it may be desirable to shut down the engine or otherwise inhibit combustion within the engine cylinder having the associated leakage.

In terms of assuring that the steps of the present invention are preferably carried out under constant load conditions, such a determination could be made prior to initiating the steps of flowchart 100. For example, if the dual fuel engine is being used in a generator application a power feedback signal could be monitored. Further, if the dual fuel engine is being used in a pump application then engine speed could be monitored as an indicator of constant load.

It is recognized that variations to the steps depicted in flowcharts 100 and 130 could be made without departing from the scope of the present invention. In particular, steps could be added or some steps could be eliminated. All such variations are intended to be covered by the present invention. Further, although the present invention has been described with specific reference to the solenoid valve assembly of FIG. 1, there exist numerous gaseous fuel admission valve constructions to which the present invention is equally applicable. The terminology "gaseous fuel admission valve" is intended to cover all such constructions. It is also recognized that in most applications an engine control system including ECM 64 will include a variety of other sensors and control apparatus.

Other aspects, objects and advantages of the present invention can be obtained from a study of the drawings, the disclosure and the appended claims.

What is claimed is:

1. A method of detecting leakage through a gaseous fuel admission valve of a dual fuel engine capable of operating in both a liquid fuel mode and a dual fuel mode, the engine including at least one such gaseous fuel admission valve positioned between a source of gaseous fuel and an engine air intake, the engine further including a gaseous fuel shut off valve positioned between the source of gaseous fuel and the gaseous fuel admission valve, the method comprising the steps of:

(a) determining a liquid fuel rate when the engine is operating in a liquid fuel mode and the gaseous fuel shut off valve is closed;

(b) opening the gaseous fuel shut off valve while the engine is operating in the liquid fuel mode;

(c) determining a liquid fuel rate after the gaseous fuel shut off valve is opened in step (b) and while the engine is operating in the liquid fuel mode; and (d) comparing the liquid fuel rate determined in step (c) with the liquid fuel rate determined in step (a).

2. The method, as set forth in claim 1, wherein step (d) includes determining whether the liquid fuel rate determined in step (c) exceeds the liquid fuel rate determined in step (a) by at least a predetermined amount.

3. The method, as set forth in claim 2, wherein, if the liquid fuel rate determined in step (c) exceeds the liquid fuel rate determined in step (a) by at least the predetermined amount, leakage of the gaseous fuel admission valve is indicated and the engine is inhibited from operating in a dual fuel mode.

4. The method, as set forth in claim 2, wherein, if the liquid fuel rate determined in step (c) does not initially exceed the liquid fuel rate determined in step (a) by at least the predetermined amount, steps (c) and (d) are repeated a predetermined number of times.

5. The method, as set forth in claim 2, wherein, if the liquid fuel rate determined in step (c) does not exceed the liquid fuel rate determined in step (a) by at least the predetermined amount, an absence of leakage is indicated.

6. The method, as set forth in claim 2, wherein the engine includes a plurality of gaseous fuel admission valves, each valve associated with an intake port of a respective engine cylinder, and wherein, if the liquid fuel rate determined in step (c) does not exceed the liquid fuel rate determined in step (a) by at least the predetermined amount, the method further comprises the steps of:

(e) sensing a detonation level associated with at least one cylinder of the engine; and (f) comparing the sensed detonation level with a predetermined detonation level.

7. The method, as set forth in claim 6, wherein, if in step (f) the detonation level sensed in step (e) exceeds the predetermined detonation level, leakage of the gaseous fuel valve associated with such cylinder is indicated and the engine is inhibited from operating in a dual fuel mode.

8. The method, as set forth in claim 1, wherein step (a) includes storing the determined liquid fuel rate in memory associated with an electronic controller of the engine.

9. The method, as set forth in claim 1, further comprising the step of verifying that the engine is operating at a constant load before performing steps (b) through (d).

10. A method of detecting leakage through a gaseous fuel admission valve of a dual fuel engine capable of operating in both a liquid fuel mode and a dual fuel mode, the engine including a plurality of gaseous fuel admission valves, each gaseous fuel admission valve being positioned between a source of gaseous fuel and an intake port of a respective cylinder of the engine, the engine further including a gaseous fuel shut off valve positioned between the source of gaseous fuel and the gaseous fuel admission valves, the method comprising the steps of:

(a) determining a detonation level for the engine indicative of gaseous fuel leakage through at least one gaseous fuel admission valve;

(b) opening the gaseous fuel shut off valve while the engine is operating in a liquid fuel mode;

(c) sensing a detonation level associated with at least one cylinder of the engine; and (d) comparing the detonation level sensed in step (c) with the predetermined detonation level of step (a) to determine if the gaseous fuel admission valve is leaking.

11. The method, as set forth in claim 10, wherein, if the detonation level sensed in step (c) exceeds the predetermined detonation level, leakage of the gaseous fuel admission valve associated with such cylinder is indicated.

12. A gaseous fuel leakage detection system for a dual fuel engine capable of operating in both a liquid fuel mode and a dual fuel mode, the engine including at least one gaseous fuel admission valve positioned between a source of gaseous fuel and a cylinder intake port, and a gaseous fuel shut off valve positioned between the source of gaseous fuel and the at least one gaseous fuel admission valve, the leakage detection system comprising:

an accelerometer for sensing a detonation level within the engine cylinder and responsively producing a signal indicative of the detonation level;

an electronic controller connected to the accelerometer for receiving signals therefrom and connected to the gaseous fuel shut off valve for control thereof;

the electronic controller being operable to open the gaseous fuel shut off valve while the engine is operating in the liquid fuel mode;

the electronic controller being operable to receive at least one signal for the accelerometer after the opening of the gaseous fuel shut off valve; and the electronic controller being further operable to determine, based upon the at least one signal received from the accelerometer after the opening of the gaseous fuel shut off valve, whether a detonation level within the engine cylinder exceeds a predetermined detonation level indicative of gaseous fuel leakage.

13. A gaseous fuel leakage detection system for a dual fuel engine capable of operating in both a liquid fuel mode and a dual fuel mode, the engine including at least one gaseous fuel admission valve positioned between a source of gaseous fuel and an engine air intake, the leakage detection system comprising:

an engine speed sensor;

a gaseous fuel shut off valve positioned between the source of gaseous fuel and the gaseous fuel admission valve;

at least one fuel injector positioned between a source of liquid fuel and an engine cylinder;

an electronic controller connected to the engine speed sensor for receiving signals therefrom and connected to both the gaseous fuel admission valve and the fuel injector for control thereof, the electronic controller including a governor operable during a liquid fuel mode of operation to maintain a substantially constant engine speed, the governor being responsive to signals received from the engine speed sensor and being operable to output a liquid fuel rate indicator;

the electronic controller being operable to affect opening of the gaseous fuel shut off valve during a liquid fuel mode of engine operation;

the electronic controller being operable to determine the liquid fuel rate indicated by the governor while the engine is in the liquid fuel mode and the gaseous fuel shut off valve is in its closed condition and the electronic controller being operable to determine the liquid fuel rate indicated by the governor while the engine is in the liquid fuel mode and the gaseous fuel shut off valve is in its open condition; and the electronic controller being further operable to compare the liquid fuel rate indicated by the governor before opening of the gaseous fuel shut off valve with the liquid fuel rate indicated by the governor after opening of the gaseous fuel shut off valve.

14. The gaseous fuel leakage detection system, as set forth in claim 13, wherein the electronic controller is operable to determine if the liquid fuel rate indicated by the governor before opening of the gaseous fuel shut off valve exceeds the liquid fuel rate indicated by the governor after opening of the gaseous fuel shut off valve by at least a predetermined amount.

15. The gaseous fuel leakage detection system, as set forth in claim 14, wherein, if the liquid fuel rate indicated by the governor before opening of the gaseous fuel shut off valve exceeds the liquid fuel rate indicated by the governor after opening of the gaseous fuel shut off valve by at least the predetermined amount, the electronic controller is operable to inhibit operation of the engine in a dual fuel mode.

* * * * *